United States Patent [19]

Loucas

[11] Patent Number: 4,953,307
[45] Date of Patent: Sep. 4, 1990

[54] RIM OFFSET GAUGE

[76] Inventor: Theodore Loucas, 198-18 51st Ave., Bayside, N.Y. 11365

[21] Appl. No.: 347,176

[22] Filed: May 3, 1989

[51] Int. Cl.⁵ ............................................. G01D 21/00
[52] U.S. Cl. ........................................ 33/600; 33/203; 33/809
[58] Field of Search .............. 33/600, 809, 827, 542.1, 33/542, 203.18, 203

[56] References Cited

U.S. PATENT DOCUMENTS

| | | | |
|---|---|---|---|
| 794,031 | 7/1905 | Lehman | 33/203 |
| 1,655,133 | 1/1928 | Clase | 33/827 |
| 2,325,362 | 7/1943 | Black . | |
| 2,853,794 | 9/1958 | Van Winkle | 33/600 |
| 3,222,789 | 12/1965 | Bishop et al. | 33/809 |
| 4,167,817 | 9/1979 | Hunter . | |
| 4,271,599 | 6/1981 | Pavitt | 33/203.18 |
| 4,290,205 | 9/1981 | Holm . | |
| 4,407,073 | 10/1983 | Nilsson et al. | 33/203.18 |
| 4,453,315 | 6/1984 | Mosiman et al. . | |
| 4,566,200 | 1/1986 | Brady et al. | 33/809 |

FOREIGN PATENT DOCUMENTS

| | | | |
|---|---|---|---|
| 0405871 | 2/1934 | United Kingdom | 33/827 |
| 0587700 | 5/1947 | United Kingdom | 33/542.1 |
| 0670651 | 4/1952 | United Kingdom | 33/809 |

Primary Examiner—Thomas B. Will
Attorney, Agent, or Firm—Gottlieb, Rackman & Reisman

[57] ABSTRACT

A gauge for measuring the fender well dimensions of an automobile is provided and includes a handle portion and a head portion. The head portion is used to measure well width so that one can determine the widest usable tire. The gauge is also used to calculate rim offset in a rim suitable for the selected wide tire.

12 Claims, 3 Drawing Sheets

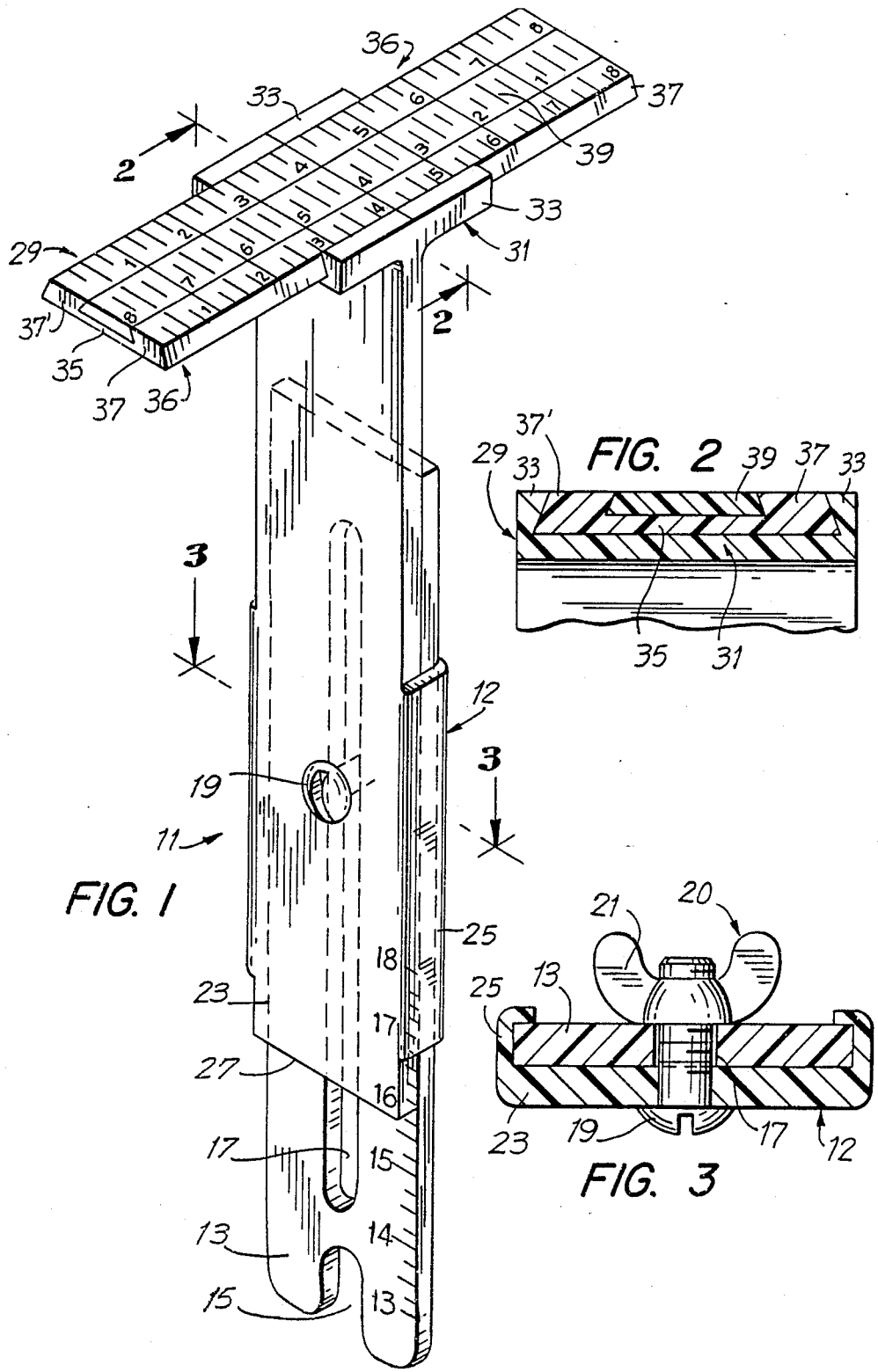

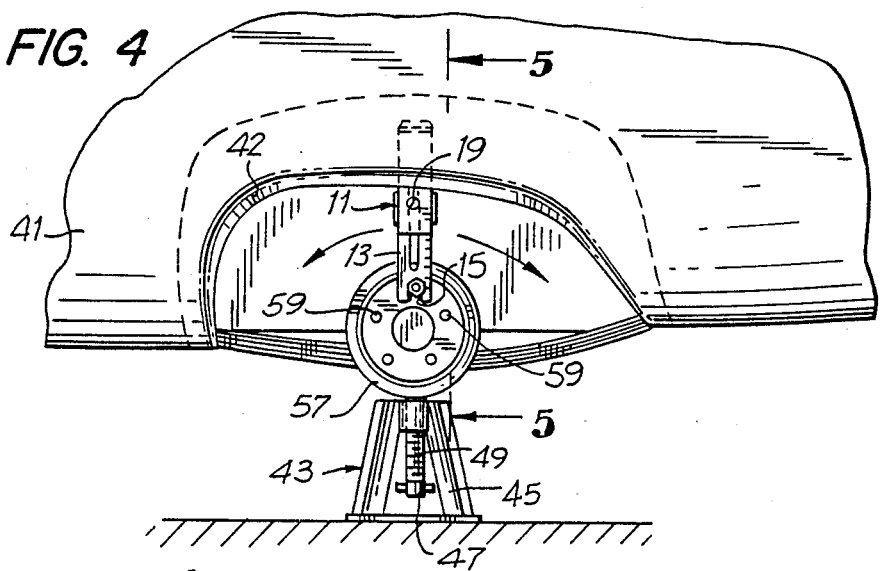
FIG. 4
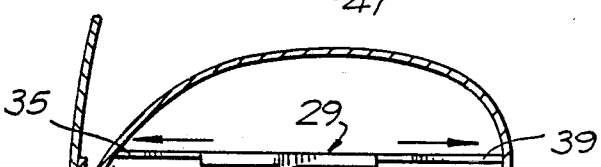
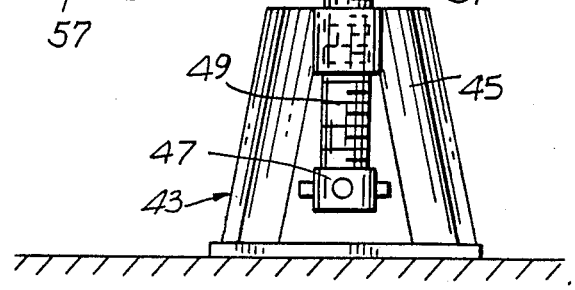
FIG. 5

RIM OFFSET GAUGE

BACKGROUND OF THE INVENTION

This invention is directed to a rim offset gauge and its method of use, and more particularly to a gauge which may be used to take appropriate measurements of a car wheel as it relates to the fender well and determine what size tire can be used for replacement purposes.

Among automobile buffs, there is a practice of purchasing automobiles and then replacing the standard tires and/or wheels that come with the car with "fatter" or larger tires. This gives the car a more substantial look, permits greater amounts of tread contact with the road and generally "spruces up" the look of the car to the liking of the user.

However, in making this tire and/or wheel replacement, car enthusiasts frequently run into problems in picking the wrong size tire and rim. Although enthusiasts know the dimensions of the tire that they are replacing and the one they may be interested in buying, they do not know all of the exact dimensions of the space in the car where the new tire is going to be placed—primarily the fender well surrounding the tire and the dimension from the wheel mounting surface to the inner edge of the mounting area—this latter dimension is known as the "rim offset" or "backspace" distance.

Accordingly, it would be desirable to provide a method for measuring the dimensions in the fender well so that an appropriate sized tire and rim may be purchased for replacement purposes.

SUMMARY OF THE INVENTION

Generally speaking, in accordance with the invention, a gauge for measuring the fender well dimensions of an automobile is provided. The gauge includes a handle assembly comprising a handle and a handle extension slidably coupled to the handle so that the vertical extent of the gauge may be increased. The gauge also includes a head assembly comprising a pair of slidably interconnected rulers which may be spread apart in order to measure the width of the fender well of a car.

In order to operate the rim offset gauge of the invention, the rear portion of the automobile is first "jacked" up so that both rear wheels may be removed. Then, the bottom of the handle assembly is mounted on one of the wheel studs or bolts of the axle hub at the "twelve o'clock" position. The gauge is mounted such that it projects up and into the fender well and can be rotated around by rotational movement of the hub so that the narrowest portion of the fender well may be measured.

By using the gauge of the invention in this manner, one is able to determine total fender well width. By subtracting the desired clearance from the fender well and the mounted tire, one can then determine the widest tire which may be used. In addition, by measuring from the inner side of the fender well to the hub and from the outer side of the fender well to the hub, it is also possible to determine what offset is required for the rim to be used with the tire.

The rim offset gauge of the invention and its method of use thus enables car enthusiasts to measure all the relevant dimensions when they are replacing their original tires (and rims) with new "fatter" tires that will have to fit within the existing fender well of the automobile.

Accordingly, it is an object of this invention to provide a new and improved method for measuring the size of the fender well as it relates to what size tire may be mounted therein.

Still another object of the invention is to provide a device which can be used to determine the rim offset/backspace required of a rim that receives a certain sized tire.

Yet a further object of the invention is to provide a device for measuring the maximum diameter tire which may be mounted in a fender well.

Another object of the invention is to provide a device for measuring various fender well measurements which is easy to operate.

Still other objects and advantages of the invention will in part be obvious and will in part be apparent from the following description.

The invention accordingly comprises the several steps and the relation of one or more of such steps with respect to each of the others, and the product having the features, properties and relation of elements which are exemplified in the following detailed disclosure, and the scope of the invention will be indicated in the claims.

BRIEF DESCRIPTION OF THE DRAWINGS

For a fuller understanding of the invention, reference is made to the following description, taken in connection with the accompanying drawings, in which:

FIG. 1 is a perspective view of a rim offset gauge made in accordance with the invention;

FIG. 2 is a cross-sectional view taken along line 2—2 of FIG. 1;

FIG. 3 is a cross-sectional view taken along line 3—3 of FIG. 1;

FIG. 4 is a side-elevational view showing the rim offset gauge of FIG. 1 disposed in an operating position in a fender well of an automobile after the rear end of the automobile has been raised by a jack assembly;

FIG. 5 is a cross-sectional view taken along line 5—5 of FIG. 4;

DETAILED DESCRIPTION OF THE PREFERRED EMBODIMENT

Figure 7:
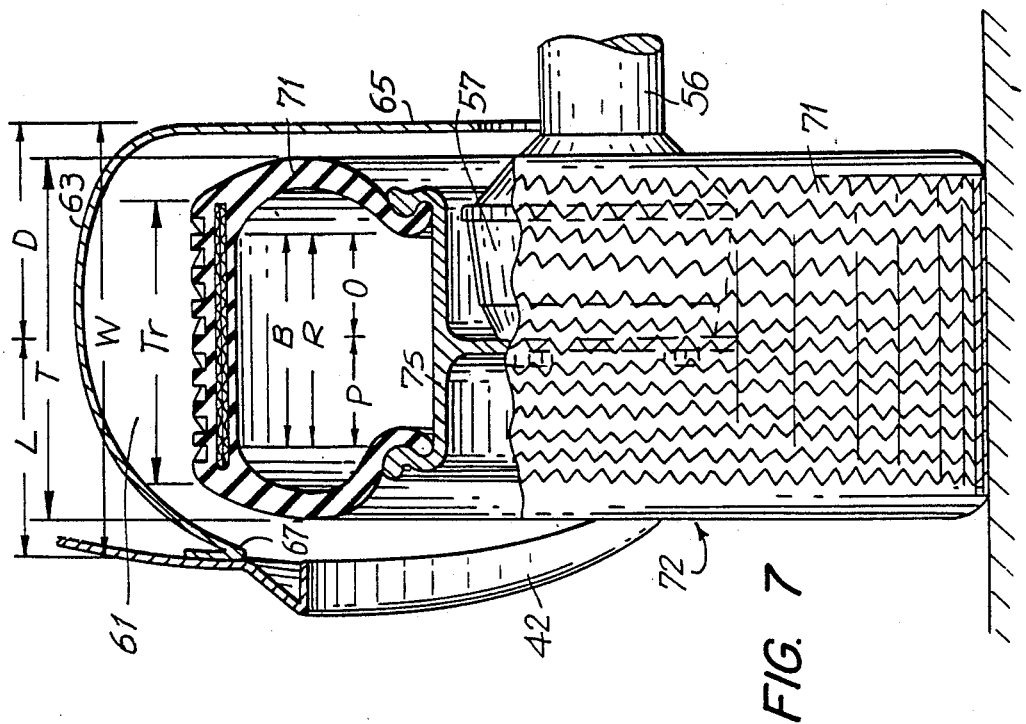
FIG. 7 is also a front elevational view in partial cross-section showing an oversized tire assembly mounted in the fender well shown in FIG. 6.

Referring first to FIGS. 1-3, a rim offset gauge made in accordance with the invention and generally indicated at 11 is shown. Gauge 11 has a substantially T-shaped configuration and includes a handle assembly indicated at 12 and a head assembly indicated at 29. Handle assembly 12 comprises a handle member 13 slidably coupled to a handle extension member 23. Handle member 13 has a substantially rectangular configuration and is approximately 12 inches in length. Handle member 13 is formed with an inwardly disposed running slot 17 and a notch 15 at the bottom portion thereof. Notch 15 receives a stud projecting outwardly from the hub of a conventional wheel assembly when operating gauge 11, as described in more detail below.

Handle extension member 23 has a pair of longitudinally running side arms 25 between which handle member 13 is slidably retained. Handle extension member 23 retains through the mid-portion thereof a screw assembly generally indicated at 20 for slidably coupling handle member 13 to handle extension member 23. Screw assembly 20 comprises a screw or bolt 19 disposed through slot 17 formed in handle member 13 and a winged nut 21 mounted over the forward end of screw 19 (along the back portion of handle member 13) for tightening and loosening screw assembly 20 as desired by the operator of gauge 11.

In order to increase or decrease the vertical length of handle assembly 12, wing nut 21 of screw assembly 20 is turned counter clockwise (to be loosened about screw 19) so that handle extension member 23 may slidably move either upwardly or downwardly with respect to handle member 13. Once the appropriate dimension of handle assembly 12 is achieved, nut 21 is turned clockwise to tighten screw assembly 20. Since the length of handle extension member 23 is approximately 12 inches, by appropriately adjusting the overall vertical length of handle assembly 12, one can determine the length from the bottom of handle member 13 to the top of handle member extension 23 by looking at the number marking on handle member 13 that is aligned with bottom edge 27 of handle extension member 23. As described in detail below, this measurement will enable the operator of gauge 11 to determine the radius and/or diameter of the oversided tire to be mounted in the fender well of an automobile.

Continuing with FIGS. 1 and 2, the head assembly generally indicated at 29 of rim offset gauge 11 is now described. Head assembly 29 comprises a base 31 transversely disposed with respect to the top end of handle extension member 23 and integrally formed therewith and a ruler assembly 36 housed therein. Base 31 includes a pair of upwardly disposed longitudinally extending side walls 33 which define a jacket for receiving ruler assembly 36. Ruler assembly 36 includes a first ruler member 35 having a first longitudinal edge 37, a second longitudinal edge 37' and a longitudinal slot (not indicated) formed therebetween. As illustrated, each of edges 37 and 37, are marked along the top surface thereof with references numbers indicating inches.

As shown in FIG. 1, the longitudinal slot defined by edges 37 and 37, slidably retains a second ruler member 39 marked along the top surface thereof with references numbers for indicating inches. In operation, ruler assembly 36 of head assembly 29 is used to measure the width in a fender well of an automobile. Ruler member 35 may be slid to the left while ruler member 39 may be slid to the right until the forward edges of ruler members 35 and 39 abut the outside and inside surfaces respectively that define the fender well of an automobile, described below.

Referring now to FIGS. 4-5, the operation of rim offset gauge 11 in a manner in accordance with the invention is illustrated. In the first instance, it is necessary to jack up the rear end of an automobile 41 so that automobile 41 is supported under rear axle 55. To achieve this, a jack assembly generally indicated at 43 of the type well know in the art is used. Jack assembly 43 includes a jack housing 45, a driving member 47, a screw member 49 which may be rotated upwardly and downwardly in response to the rotation of driving member 47, and a head 51 supported along the forward end of screw member 49. Head member 51 supports a bumper 53 on which rear axle 55 of car 41 rests when operating jack assembly 43.

After jacking up the rear portion of automobile 41, as described above, the rear wheel assembly (consisting of the tire and rim) mounted along the outer surface of hub 57 (coupled to axle 55) is removed. Hub 57 is retained within a fender well 61 defined by a top wall 63, an inside wall 65 and an outside wall 67 (located in automobile side 42).

As shown in FIG. 4, gauge 11 is appropriately mounted along the outer surface of one of hubs 57 by disposing notch 15 about the uppermost wheel stud 59 so that gauge 11 is in a "twelve o'clock" position. After mounting gauge 11 onto hub 57, gauge 11 is extended upwardly by loosening wing nut 21 and sliding handle extension member 23 upwardly in the direction of arrow A up into fender well 61 at a height where head assembly 29 is about where the outer edge of the tire of the wheel assembly to be mounted on hub 57 is desired.

In order to measure the width of fender well 61 in which the tire of the wheel assembly is retained, gauge 13 is rotated by rotating the hub 57 in a conventional manner. This enables the operator to measure the narrowest width of fender well 61 from inside wall 65 to outside wall 67 by means of ruler assembly 36 connected to the handle assembly 12 of gauge 11 as shown in FIG. 5.

As described above, each of ruler members 35 and 39 of ruler assembly 36 are provided with measurement markings (such as inches) in order to determine the overall distance from one end of ruler member 35 to the other end of ruler member 39. Thus, the operator is able to determine fender well width. By subtracting the desired clearance from either side of the fender well to the tire to be mounted on hub 57, the operator can determine the widest or fattest tire that may be mounted within fender well 61.

In addition, ruler assembly 36 may be used to measure the distance from outside surface 67 to hub 57 and from inside surface 65 to hub 57. These measurements are used to calculate rim offset, as described below, which is a necessary dimension for determining the appropriate rim to use with the selected oversized tire.

Figure 6:
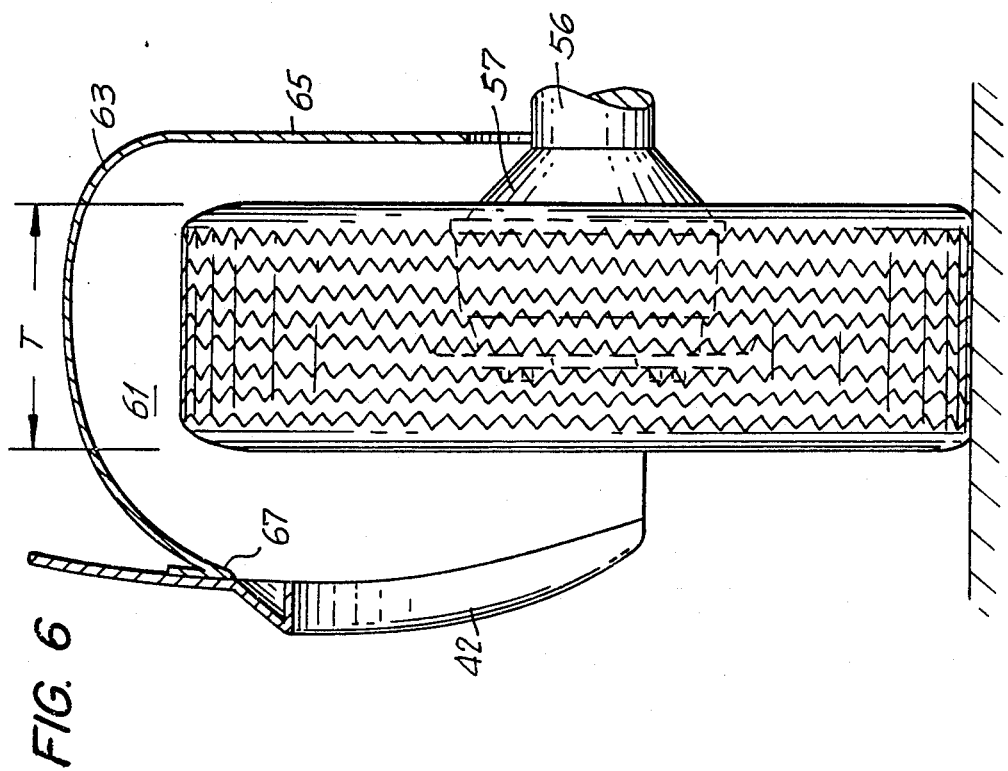
FIG. 6 is a front elevational view showing a conventional tire assembly mounted within the fender well illustrated in FIGS. 4-5.

Reference is now made to to FIG. 7 (also to FIG. 6 which shows a conventional tire) which illustrates the mounting of wheel assembly 72 onto hub 57 of axle assembly 56. Wheel assembly 72, as stated before, consists of an oversized tire 71 and a rim 75 retained therein in a conventional manner. Oversized tire 71 has a tread width Tr which is a measurement of the width of the tire which contacts the road surface, a sidewall or overall tire width T which measures the widest part of the tire (where the tire bulges out), and tire bead width B which measures the part of the tire which contacts rim 75 when tire 71 is retained thereby. Of these dimensions, the sidewall or tire width T is the most critical dimension since that is the measurement which must be at least somewhat less than the width of fender well 61, measured by gauge 11 of the invention, so that tire 71 can freely rotate within well 61.

For most tires, once a certain tire width T is chosen (the maximum that can fit within fender well 61), a corresponding or related rim 75 having a certain width of its own must be used. Referring again to FIG. 7, it is shown that rim 75 has a rim width R, (same as tire bead width 8B) which measures the dimension between the two inner bead surfaces of the rim, and a rim offset 0, which measures the distance between where rim 75 is mounted to hub 57 and the inner bead surface on the inside part of rim 75.

As is well known, the distance between the rim to hub mounting surface and the inner bead mounting surface on the inside part of the rim (the rim offset) and the distance between the rim to hub mounting surface and the inner bead mounting surface on the outside part of the rim are not always the same. This is because the hub mounting surface is often times not centered within fender well 61 and a rim having these different spacing helps relieve this lack of centering so that a tire retained thereby is centered within fender well 61.

Therefore, in order to determine what rim to use for a tire having a width just less than the width of fender well 61 (measured by guage 11), it is necessary to first select a rim width for a rim which is usable with the chosen tire. There is usually (but not always one rim width that is usable with a certain sized (wide) tire, and this information is available in most tire manufacturer's handbooks or reference guides.

Once rim width is chosen, it is now necessary to calculate the appropriate rim offset for a rim having that rim width that is usable with an oversized tire mounted in fender well 61. We know that:

$$O + P = R,$$

where O = rim offset (the distance between the rim to hub mounting surface and the inner bead mounting surface on the inside part of the rim),
P = the distance between the rim to hub mounting surface and the inner bead mounting surface on the outside part of the rim, and
R = rim width.
Moreover, we also know that:

$$C + O = D + P$$
$$D - C = O - P,$$

where D = the distance from the inside surface that defines fender well 61 to the hub mounting surface, and
C = the distance from the outside surface defining fender well 61 to the hub mounting surface.
Thus, $$O + P = R$$
$$O + C = D + P$$
$$2O = R + D - C + P - P$$
$$2O = R + D - C$$
$$O = \frac{R + D - C}{2}$$

Accordingly, rim offset for a rim suitable for a tire whose width is just less than the width of fender well 61 may be calculated by adding the required rim width to the difference between (D−C) and then dividing by two.

In some situations, it may not be desirable to replace both the tire and the rim of the wheel assembly. Instead, the car operator may simply want to determine the fattest tire which he or she can use with the rim of the tire assembly that is already mounted on the hub mounting surface. Accordingly, first measure fender well width (W), the distance from the inside surface to the hub mounting surface (D) and the distance from the outside surface to the hub mounting surface (C) using the gauge of the invention. Then, determine rim width and rim offset for the rim which is already being used to define the values R and O.

It is now possible to calculate the maximum sized (wide) tire (T) which may be used in fender well 61.

$T < 2$ times the smaller of
$C + O - \frac{R}{2}$ and $D - O + \frac{R}{2}$

OR $$T < 2 \times \min\left(C + O - \frac{R}{2}, D - O + \frac{R}{2}\right)$$

The gauge of the invention may also be used to determine fender well width for a front tire assembly of an automobile. In this regard, the operator mounts the gauge of the invention on the selected hub in the same manner as before. However, in order to make sure there is sufficient clearance when the automobile is turned during driving, the operator should turn the steering wheel to one side and rotate the hub with the gauge coupled thereto to measure the clearing point. The same thing should be done after turning the wheel in the opposite direction.

With the use of the gauge of the invention, the automobile owner will avoid costly, dangerous mistakes by buying the wrong tire and rim combination, which in the worst scenerio might initiate tire blowout because of contact with the fender of the automobile.

Thus it will be seen that the objects set forth above among those apparent made from the preceding description are additionally attained and since certain changes may be made in carrying out the above method and in construction set forth without departing from the spirit and scope of the invention, it is intended that all matter contained in the above description and shown in the accompanying drawings shall be interpreted as illustrated and not in a limiting sense.

It is also to be understood that the following claims are intended to cover all of the generic and specific features of the invention herein described and all statements of the scope of the invention which as a matter of language might be said to fall therebetween.

What is claimed is:

1. An apparatus for measuring fender well width in an automobile in order to determine the maximum sized tire or a wheel assembly which may be mounted on a hub mounting surface disposed in said fender well comprising:
   a handle assembly;
   means for independently and selectively adjusting the length of the handle assembly;
   a head assembly connected to said handle assembly at the upper end thereof and substantially perpendicularly thereto;
   means for independently and selectively adjusting the overall length of the head assembly in order to measure the fender well width;
   wherein said head assembly length adjusting means operates independently of said handle assembly length adjusting means.

2. The apparatus of claim 1, wherein said handle assembly comprises a handle member and a handle extension slidably coupled to said handle member in order to adjust the length of said handle assembly.

3. The apparatus of claim 2, wherein said handle member includes a longitudinally extending slot for accommodating a screw assembly coupled to said handle extension.

4. The apparatus of claim 3, wherein said screw assembly includes a screw member disposed through said slot and a rotatable nut.

5. The apparatus of claim 4, wherein said nut may be tightened for preventing the handle extension from slidably moving with respect to said handle member and which may also be loosened for enabling said extension to be slidably moved with respect to said handle member.

6. The apparatus of claim 2, wherein said handle member includes a notch for accommodating a bolt projecting from said hub mounting surface.

7. An apparatus for measuring fender well width in an automobile in order to determine the maximum size tire of a wheel assembly which may be mounted on a hub mounting surface disposed in said fender well comprising:
   a handle assembly, said handle assembly including a notch at the lower end thereof for accommodating a bolt projecting from said hub mounting surface;
   means for selectively and independently adjusting the length of the handle assembly;
   a head assembly connected to said handle assembly at the upper end thereof and substantially perpendicular thereto; and
   means for selectively and independently adjusting the length of the head assembly in order to measure the fender well width.

8. An apparatus for measuring fender well width in an automobile in order to determine the maximum sized tire of a wheel assembly which may be mounted on a hub mounting surface disposed in said fender well comprising:
   a handle assembly;
   means for selectively and independently adjusting the length of the handle assembly;
   a head assembly connected to said handle assembly at the upper end thereof and substantially perpendicular thereto, said head assembly including a base, a first ruler member slidably moveable in a first direction with respect to said base, and a second ruler member slidably moveable in a second direction with respect to said base and opposite said first direction; whereby the length of said head assembly may be selectively and independently adjusted in order to measure the fender well width.

9. A method for measuring fender well width in an automobile in order to determine the maximum sized tire of a wheel assembly which may be mounted on a hub mounting surface disposed in said fender well, the method utilizing a handle assembly and a head assembly connected to said handle assembly at the upper end thereof and substantially perpendicular thereto, the method comprising the steps of:
   mounting the handle assembly along said hub mounting surface;
   selectively adjusting the length of the handle assembly; and
   selectively adjusting the overall length of the head assembly in order to measure the fender well width.

10. The method of claim 4, wherein:
    said handle assembly comprises a handle member and a handle extension; and
    said handle assembly length adjusting step comprises slidably moving said handle extension with respect to said handle member.

11. The method of claim 9, wherein:
    said head assembly includes a base, a first ruler member and a second ruler member; and
    said head assembly length adjusting step comprises at least one of slidably moving said first ruler member in a first direction with respect to said base and slidably moving said second ruler member in a second opposite direction with respect to said base.

12. The method of claim 9, wherein:
    said handle assembly includes a notch at the lower end thereof; and
    said mounting step includes engaging said notch with a bolt projecting from said hub mounting surface.

* * * * *